UNITED STATES PATENT OFFICE.

EUGEN HORNUNG AND STEFAN HANSEL, OF VIENNA, AUSTRIA-HUNGARY.

PROCESS OF TREATING INDIA-RUBBER, GUTTA-PERCHA, AND THEIR COMPOSITIONS.

SPECIFICATION forming part of Letters Patent No. 657,240, dated September 4, 1900.

Application filed May 8, 1897. Serial No. 635,642. (No specimens.)

*To all whom it may concern:*

Be it known that we, EUGEN HORNUNG and STEFAN HANSEL, subjects of the Emperor of Austria-Hungary, residing at Vienna, in the Province of Lower Austria, in the Empire of Austria-Hungary, have invented certain new and useful Improvements in Processes of Treating India-Rubber, Gutta-Percha, and Their Compositions; and we do hereby declare the following to be a full, clear, and exact description of the invention, such as will enable others skilled in the art to which it appertains to make and use the same.

The invention consists in a novel process of treating rubber, gutta-percha, or compounds thereof and the product of such process.

As is well known, india-rubber, gutta-percha, and their compositions when vulcanized contain free sulfur and become hard and brittle by the oxidizing action of the oxygen of the air upon the surfaces exposed thereto or when these bodies are exposed to high temperatures, as is the case when used, for instance, as packing for steam-distributing pipes or other steam fittings, and that when said bodies become hardened their properties are virtually destroyed.

Our invention has for its object to avoid the disadvantage referred to by the addition to the rubber or equivalent of a compound that will protect it against oxidation or against hardening when exposed to high temperatures, and whereby a product is obtained that is absolutely free from free sulfur.

We have found by experiments that it is not possible to intimately and uniformly mix gelatin or glue that is insoluble in water with india-rubber, gutta-percha, or their compounds unless the gelatin or glue is in a plastic condition, nor is it possible to obtain by the ordinary methods of vulcanization a product that is absolutely free from free sulfur, a fact which is well known. Although the gelatin or glue when rendered insoluble in water in a well-known manner by precipitation from its solution is obtained in the form of a more or less plastic mass, it cannot be incorporated with rubber or the like on account of the water present, which when the compound is vulcanized is evaporated and results in a more or less porous body. It is therefore essential that the insoluble plastic glue or gelatin be free from water before being incorporated with the india-rubber or the like.

Inasmuch as it is very difficult to avoid the presence of free sulfur in vulcanizing rubber by the usual methods it is also necessary in order to obtain a product that is free from such free sulfur to provide means whereby the whole of the sulfur required for vulcanization is chemically combined with the rubber or the like. Both these objects we attain by mixing the insoluble gelatin or glue first with a body containing the required quantity of sulfur not in a free state, but chemically bound thereto, and to this end we use what is called "vulcanized oil," and the admixture of the insoluble gelatin or glue with the oil can be materially facilitated by swelling out the oil with turpentine, benzin, or a similar volatile hydrocarbon, the compound being then dried or freed from moisture by heat, whereby not only the water, but also the volatile hydrocarbon, if such be used, is or are evaporated, the operation of drying being conducted carefully, when the plastic compound thus obtained can be readily and intimately mixed with the india-rubber or the like by mechanical agencies and finally subjected to heat for the purpose of vulcanization.

What is known as "vulcanized oil" is an oil of the fatty series, such as linseed or poppy or another oil of the fatty series, treated with sulfur chlorid. The proportion of sulfur chlorid depends, of course, upon the nature of the product to be obtained, whether it is to be a tough or a hard product. For our uses a tough product is the most advantageous, and to this end we use about fifteen parts, by weight, of sulfur chlorid to about one hundred parts of oil—say linseed-oil. Of course, as will be readily understood, the sulfur is in this case chemically bound in the compound, so that there cannot be any free sulfur in the final product. Of this vulcanized oil, preferably after swelling with a volatile hydrocarbon, we take from 0.1 to 0.5 parts, by weight, and mix it intimately with the insoluble gelatin or glue, the compound being then dried and mixed with the india-rubber, gutta-percha, or their compositions, and finally subjected to heat, as above set forth. The proportions of insoluble gelatin or glue and vulcanized oil to be used will depend upon the nature of the material with which they are to be incorporated, whether rubber, gutta-percha, or their compositions, and the proportion of filling mass they contain.

Having thus described our invention, what we claim as new therein, and desire to secure by Letters Patent, is—

1. The process, which consists in mixing a vulcanized oil of the fatty series with a gelatinous or glutinous substance insoluble in water, freeing the mixture from moisture, mixing therewith rubber or a compound thereof and subjecting the composition of matter to a vulcanizing temperature, for the purpose set forth.

2. The process, which consists in swelling a vulcanized oil of the fatty series with a volatile hydrocarbon, mixing the same with a gelatinous or glutinous substance insoluble in water, evaporating the hydrocarbon and moisture from the compound, mixing therewith rubber or a compound thereof and subjecting the composition of matter to a vulcanizing temperature, for the purpose set forth.

3. The herein-described composition of matter, consisting of rubber or a rubber compound, a gelatinous or glutinous substance insoluble in water, and a vulcanized oil of the fatty series, said compound free from water and containing no free sulfur, substantially as set forth.

In testimony whereof we affix our signatures in presence of two witnesses.

EUGEN HORNUNG.
STEFAN HANSEL.

Witnesses:
HARRY BELMONT,
DAVID ALBIN.